US007778819B2

(12) United States Patent

Bellegarda et al.

(10) Patent No.: US 7,778,819 B2

(45) Date of Patent: Aug. 17, 2010

(54) METHOD AND APPARATUS FOR PREDICTING WORD PROMINENCE IN SPEECH SYNTHESIS

(75) Inventors: Jerome R. Bellegarda, Los Gatos, CA (US); Kim E. A. Silverman, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 294 days.

(21) Appl. No.: 11/999,323

(22) Filed: Dec. 4, 2007

(65) Prior Publication Data

US 2008/0091430 A1 Apr. 17, 2008

Related U.S. Application Data

(63) Continuation of application No. 10/439,217, filed on May 14, 2003, now Pat. No. 7,313,523.

(51) Int. Cl.
*G06F 17/21* (2006.01)

(52) U.S. Cl. .......................... 704/9; 704/258; 704/257; 704/277; 704/260

(58) Field of Classification Search ..................... 704/9, 704/260, 257, 277, 258, 266, 267, 3, 2, 10, 704/255, 231, 251, 268, 269, 261
See application file for complete search history.

(56) References Cited

U.S. PATENT DOCUMENTS

| | | | | |
|---|---|---|---|---|
| 3,704,345 | A | 11/1972 | Coker et al. | |
| 4,908,867 | A | 3/1990 | Silverman | |
| 5,210,689 | A * | 5/1993 | Baker et al. | 704/1 |
| 5,212,821 | A | 5/1993 | Gorin et al. | |
| 5,299,125 | A * | 3/1994 | Baker et al. | 704/9 |
| 5,475,796 | A | 12/1995 | Iwata | |
| 5,636,325 | A * | 6/1997 | Farrett | 704/258 |
| 5,652,828 | A * | 7/1997 | Silverman | 704/260 |
| 5,732,395 | A | 3/1998 | Silverman | |
| 5,749,071 | A | 5/1998 | Silverman | |
| 5,751,906 | A | 5/1998 | Silverman | |
| 5,832,433 | A | 11/1998 | Yashchin et al. | |

(Continued)

OTHER PUBLICATIONS

"Speech Synthesis Markup Language Specification for the Speech Interface Framework", W3C Working Draft Aug. 8, 2000, http://www.w3.org/TR/speech-synthesis-20000808, 1-42 Pgs.

(Continued)

*Primary Examiner*—Vijay B Chawan
(74) *Attorney, Agent, or Firm*—Blakely, Sokoloff, Taylor & Zafman LLP

(57) ABSTRACT

A method and apparatus is provided for generating speech that sounds more natural. Determining whether information in a current sentence is new or previously given is performed based on a semantic relationship between the current sentence and a number of preceding sentences. A word prominence for the synthetic speech to a word in the current sentence is assigned in accordance with the information determination. A speech representative of the current sentence can be generated. In one embodiment, word prominence and latent semantic analysis are used to generate more natural sounding speech. A method for generating speech that sounds more natural may comprise generating synthesized speech having certain word prominence characteristics and applying a semantically-driven word prominence assignment model to specify word prominence consistent with the way humans assign word prominence.

20 Claims, 9 Drawing Sheets

U.S. PATENT DOCUMENTS

| | | | | |
|---|---|---|---|---|
| 5,832,435 | A * | 11/1998 | Silverman | 704/260 |
| 5,890,117 | A | 3/1999 | Silverman | |
| 6,064,960 | A | 5/2000 | Bellegarda et al. | |
| 6,208,971 | B1 | 3/2001 | Bellegarda et al. | |
| 6,366,884 | B1 | 4/2002 | Bellegarda et al. | |
| 6,374,217 | B1 | 4/2002 | Bellegarda | |
| 6,477,488 | B1 | 11/2002 | Bellegarda | |
| 6,553,344 | B2 | 4/2003 | Bellegarda et al. | |
| 6,751,592 | B1 * | 6/2004 | Shiga | 704/258 |
| 6,970,881 | B1 | 11/2005 | Mohan et al. | |
| 7,043,420 | B2 | 5/2006 | Ratnaparkhi | |
| 7,113,943 | B2 | 9/2006 | Bradford et al. | |
| 7,149,695 | B1 | 12/2006 | Bellegarda | |
| 7,200,558 | B2 * | 4/2007 | Kato et al. | 704/244 |
| 7,313,523 | B1 * | 12/2007 | Bellegarda et al. | 704/268 |
| 2004/0049391 | A1 | 3/2004 | Polanyi et al. | |

OTHER PUBLICATIONS

Gorin, et al., "Automated Natural Spoken Dialog", Computer, Apr. 2002, vol. 35, No. 4, 8 Pgs.

Kim E. A. Silverman, "The Structure and Processing of Fundamental Frequency Contours", University of Cambridge Doctoral Thesis, Apr. 1987, 189 Pgs.

Digital Equipment Corporation, OpenVMS RTL DECtalk (DTK$) Manual, May 1993.

Digital Equipment Corporation, "OpenVMS Software Overview", Dec. 1995.

Harry Newton, "Newton's Telecom Dictionary," Flatiron Publishing, Mar. 1998, pp. 62, 155, 610-611, 771.

* cited by examiner

METHOD AND APPARATUS FOR PREDICTING WORD PROMINENCE IN SPEECH SYNTHESIS

The present application is a Continuation of U.S. application Ser. No. 10/439,217 filed May 14, 2003 now U.S. Pat. No. 7,313,523.

FIELD OF THE INVENTION

The present invention relates generally to speech synthesis systems. More particularly, this invention relates to generating variations in synthesized speech to produce speech that sounds more natural.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2002, Apple Computer, Inc., All Rights Reserved.

BACKGROUND

Speech is used to communicate information from a speaker to a listener. In a computer-user interface, the computer generates synthesized speech to convey an audible message to the user rather than just displaying the message as text with an accompanying "beep." There are several advantages to conveying audible messages to the computer user in the form of synthesized speech. In addition to liberating the user from having to look at the computer's display screen, the spoken message conveys more information than the simple "beep" and, for certain types of information, speech is a more natural communication medium. Speech synthesis may also be useful in bulk output applications (e.g., reading aloud a document).

Generating natural sounding synthesized speech has long been the ultimate challenge for text-to-speech (TTS) systems. Not only is naturalness more aesthetically pleasant, but it affects intelligibility as well. The more closely synthetic speech models natural speech, the more richly and redundantly the content and structure of the information will be represented in the acoustic signal. This in turn means that it will be easier for the listener to recover the intended meaning from the signal—i.e., the cognitive load associated with this task will be lower. Consequently, the task of understanding the speech will interfere less with other tasks the user is performing when using the computer system. More natural TTS will thereby support a wider range of applications.

One important component of naturalness in synthesized speech is generating the correct prominence contour for each spoken sentence. As used herein, the phrase "prominence contour" refers to the relative perceptual salience or emphasis of each of the words in each spoken sentence. This is sometimes described as some words being intentionally spoken in such a way as to stand out to the listener more than other words in the same sentence. In natural speech, more or less prominence is assigned to the different words of a sentence depending on a variety of factors, including word type (e.g., function word or content word), syntactic category (e.g., noun or verb), and the semantic role (e.g., the difference between "French teachers"—meaning people who teach the French language, regardless of where they come from—versus "French teachers"—meaning teachers of any subject who happen to come from France). These factors are lexical properties of the words or noun compounds, and can usually be found in a dictionary. However, a more important function of the relative prominence of words in a sentence is to convey how the overall information is structured, and how the concepts that are conveyed by the individual words relate to each other and to the overall contextual meaning of the message as a whole. One particularly important role of relative prominence is to convey whether a word is introducing a new concept to the current discourse, or whether it is merely referring to a concept that has already been introduced earlier in the discourse. This role is often referred to as "given versus new" information. In synthesized speech (or, for that matter, natural speech), if any word is assigned the wrong prominence, the spoken sentence becomes distorted, resulting in anything from a mildly misleading change in emphasis, to the distraction of a complete shift in meaning, to the perception of a foreign accent, to an unnatural delivery affecting understandability, and thereby interfering with usability of the technology. For this reason the perceived quality of text-to-speech (TTS) systems is heavily dependent on word prominence assignment.

Most existing TTS systems use simple rules to carry out word prominence assignment. For example, function words (such as "the," "for," or "in") are not, ordinarily, emphasized; all other things being equal, nouns are assigned more prominence than verbs; and, in some recent and more sophisticated systems, new information is accentuated more than information that was previously given. In the vast majority of cases, the first two rules are easily implemented, as it is straightforward to devise a list of function words, and only slightly more challenging to maintain a list of possible parts of speech for each word. It is, however, considerably more difficult in practice to determine what constitutes "new" versus "given" information.

Some of the most recent state-of-the-art TTS systems use a simple rule for prominence assignment: give less prominence to those words that have already been seen in previous sentences (within some well-defined domain such as a paragraph, discourse segment, or document), because they refer to "given" information. However, even words that have not already been seen in previous sentences may refer to given information. What constitutes given information is more accurately measured in terms of the underlying concepts to which the words refer, rather than merely whether the words have already been seen. Since many different words can be used to express the same concept, once a concept has been introduced, all words referring to the concept should be assigned less prominence, and not just the previously used word. Determining which words express the same concept involves not only words that are synonyms, but more generally, words that are semantically related to one another. To better understand the distinction between synonyms and semantically related words, consider the following question "Has John read Lord of the Rings?" and the accompanying answer "John doesn't read books." The word "books" has little or no prominence in this context because it is semantically related to (although not a synonym for) "Lord of the Rings." If this answer were not preceded by the above question, then "books" would have greater prominence. Determining which words are semantically related is, however, very complex due to the multi-faceted nature of semantic relationships.

For example, recited below are two versions of a simple dialog with the same answer:

Why did you decide to spend your vacation in Tennessee? (1)

My mama lives in Memphis. (2)

and

You're gonna visit your mother when you're in Nashville? (3)

My mama lives in Memphis. (4)

Using the simple rules of word prominence, a prior art TTS system would generate the words mama and Memphis in both sentences (2) and (4) with about the same prominence, since neither mama nor Memphis are present in the previous sentences (1) and (3). In natural speech, however, mama and Memphis are spoken with about the same prominence only in sentence (2), while in sentence (4) mama is spoken with markedly less prominence than Memphis. This phenomenon is explained in terms of which words represent "new" information and which do not. In both sentences (2) and (4), Memphis is not only semantically related to a word in the preceding question, Tennessee or Nashville, but also adds new information (the exact location in the first answer, and the correct location in the second answer). In contrast, mama in sentence (4) is semantically related to the word mother in (3), but adds no new information since mama is a strict synonym for mother. Thus, in natural speech, the word mama is treated as a representative of a previously given concept and, accordingly, is spoken with comparatively less prominence.

The challenge, therefore, is to provide a principled way to obtain a semantically-driven prominence assignment that is consistent with the way humans assign word prominence in natural speech, in order to more redundantly convey meanings and, therefore, to generate synthesized text that is more easily understood. Doing so should result in a more natural-sounding synthetic speech with a perceptively better quality than provided by prior art TTS systems.

SUMMARY

A method and apparatus for generating speech that sounds more natural are described. According to one aspect of the present invention, a method for generating speech that sounds more natural comprises generating synthesized speech having certain word prominence characteristics and applying a semantically-driven word prominence assignment model to assign word prominence characteristics consistent with the way humans assign word prominence. In one embodiment, the word prominence assignment model employs latent semantic analysis.

According to one aspect of the invention, as each new sentence in a text to speech generator is generated, a word prominence specification system develops a word prominence assignment model by determining semantic anchors representing the preceding sentences and semantic anchors representing the general discourse domain. The word prominence specification system classifies each word in the current sentence against the semantic anchors, and obtains an appropriate score to characterize the "novelty" of the words in the current and preceding sentences in view of the general discourse domain, i.e., to characterize which information in the current sentence is new.

According to one aspect of the present invention, a machine-accessible medium has stored thereon a plurality of instructions that, when executed by a processor, cause the processor to generate synthesized speech having certain word prominence characteristics and apply a semantically-driven word prominence assignment model to assign word prominence characteristics consistent with the way humans assign word prominence. The instructions, when executed, may cause the processor to create synthesized speech by developing a word prominence assignment model including semantic anchors associated with the current and preceding sentences and the general discourse domain. The instructions may further cause the processor to determine whether a word in the current sentence represents new information by applying the model to a current sentence to classify each word against the semantic anchors.

According to one aspect of the present invention, an apparatus to generate speech that sounds more natural includes a speech synthesizer to generate synthesized speech and a semantically-driven word prominence assignment model to assign word prominence characteristics consistent with the way humans assign work prominence. The word prominence assignment model may include semantic anchors associated with the current and preceding sentences and the general discourse domain. The model may then be applied to a current sentence to classify each word of the sentence against the semantic anchors.

DETAILED DESCRIPTION

A method and an apparatus for assigning word prominence in a speech synthesis system to produce more natural sounding speech are provided. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

Figure 1:
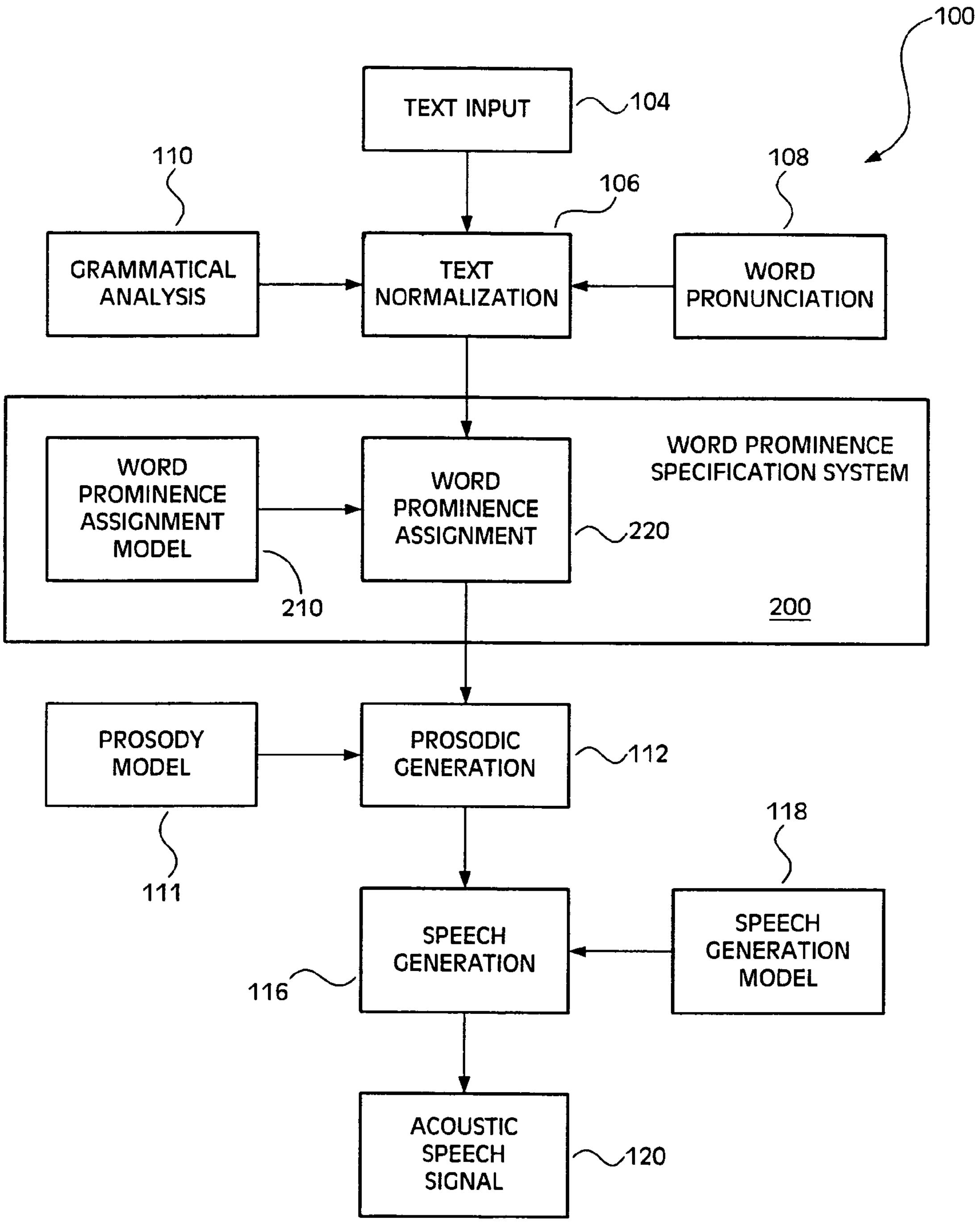
FIG. 1 is a block diagram illustrating one embodiment of a speech synthesis system having a word prominence specification system.

FIG. 1 is a block diagram illustrating one embodiment of a speech synthesis system 100 incorporating the invention, and the operating environment in which certain aspects of the illustrated invention may be practiced. The speech synthesis system 100 receives a text input 104 and performs a text normalization on the text input 104 using grammatical analysis 110 and word pronunciation 108 processes. For example if the text input 104 is the phrase "½," the text is normalized to the phrase "one half," pronounced as "wUHn hAHf." In one embodiment, the speech synthesis system 100 performs prosodic generation 112 for the normalized text using a prosody model 111. A speech generator 116 generates an acoustic speech signal 120 for the normalized text that embodies the prosodic features representative of the received text 104 in accordance with a speech generation model 118.

The TTS 100 incorporates a word prominence specification system 200 in accordance with one embodiment of the present invention. The word prominence specification system 200 applies word prominence assignment 220 to the normalized text using a word prominence assignment model 210. During operation of the TTS 100, the word prominence specification system 200 assigns word prominence characteristics to the normalized text to enable the generation of a more naturalized acoustic speech signal 120.

The two versions of the simple dialog discussed earlier underscores what is of concern in TTS synthesis: not just whether the same words appear again and again, but how "close" new words are to concepts already introduced in the preceding sentences. Sentence (1) introduced the two concepts "vacation" and "Tennessee," and sentence (3) introduced the two concepts "mother" and "Nashville." In terms of concepts, the word "mama" is much farther from sentence (1) than from sentence (3), while the word "Memphis" is about equally far from (1) and from (3). Thus, there appears to be a tight correlation between word prominence and distance from existing concepts. The closer a word is to a concept that has already been introduced earlier into the dialogue, the less prominence that word should receive.

The disclosed embodiments include apparatus and methods for quantifying this distance from existing concepts, such that an appropriate prominence can be assigned to each word of synthesized speech. When a sentence is generated—i.e., a "current sentence"—a semantic relationship between this sentence and a number of preceding sentences may be used to determine whether information in the current sentence is new or was previously given. Based on this determination of "new" versus "given" information, a word prominence may be assigned to one or more words in the current sentence. In one embodiment, as described in more detail below, latent semantic analysis (LSA) is employed to quantify this distance from existing concepts in order to determine whether information is new or previously given. However, it should be understood that a variety of other techniques besides LSA may be employed to assess whether information is "new" or "given." For example, in one alternative embodiment, each new word is considered a candidate for prominence, and a list of previously spoken words is maintained in a FIFO (first-in-first-out) buffer having a specified depth. If a current word is already in the FIFO buffer, no accent is applied to the word when spoken, but if the word is not in the buffer (i.e., the current word is a "new" word), prominence is applied to the word. In either event, the current word is placed at the "top" of the FIFO buffer, as the word is the most recent spoken word. Because the FIFO buffer has a set depth, words that are "old" are pushed out of the buffer. In a further alternative embodiment, in addition to the list of recently spoken words stored in the FIFO buffer, each word is also compared against synonyms of the words contained in the FIFO buffer. In yet another alternative embodiment, the comparison is based on word roots (e.g., word roots are stored in the FIFO buffer in addition to, or in lieu of, the recently spoken words).

In one embodiment, as noted above, the word prominence specification system 200 carries out latent semantic analysis (LSA) of the current sentence in view of the preceding sentences. LSA is known in the art, and has already proven effective in a variety of other fields, including query-based information retrieval, word clustering, document/topic clustering, large vocabulary language modeling, and semantic inference for voice command and control. In the present invention, LSA may be used to characterize what constitutes "new" versus "given" information in a document, where a document is defined as a collection of words and sentences.

Figure 2:
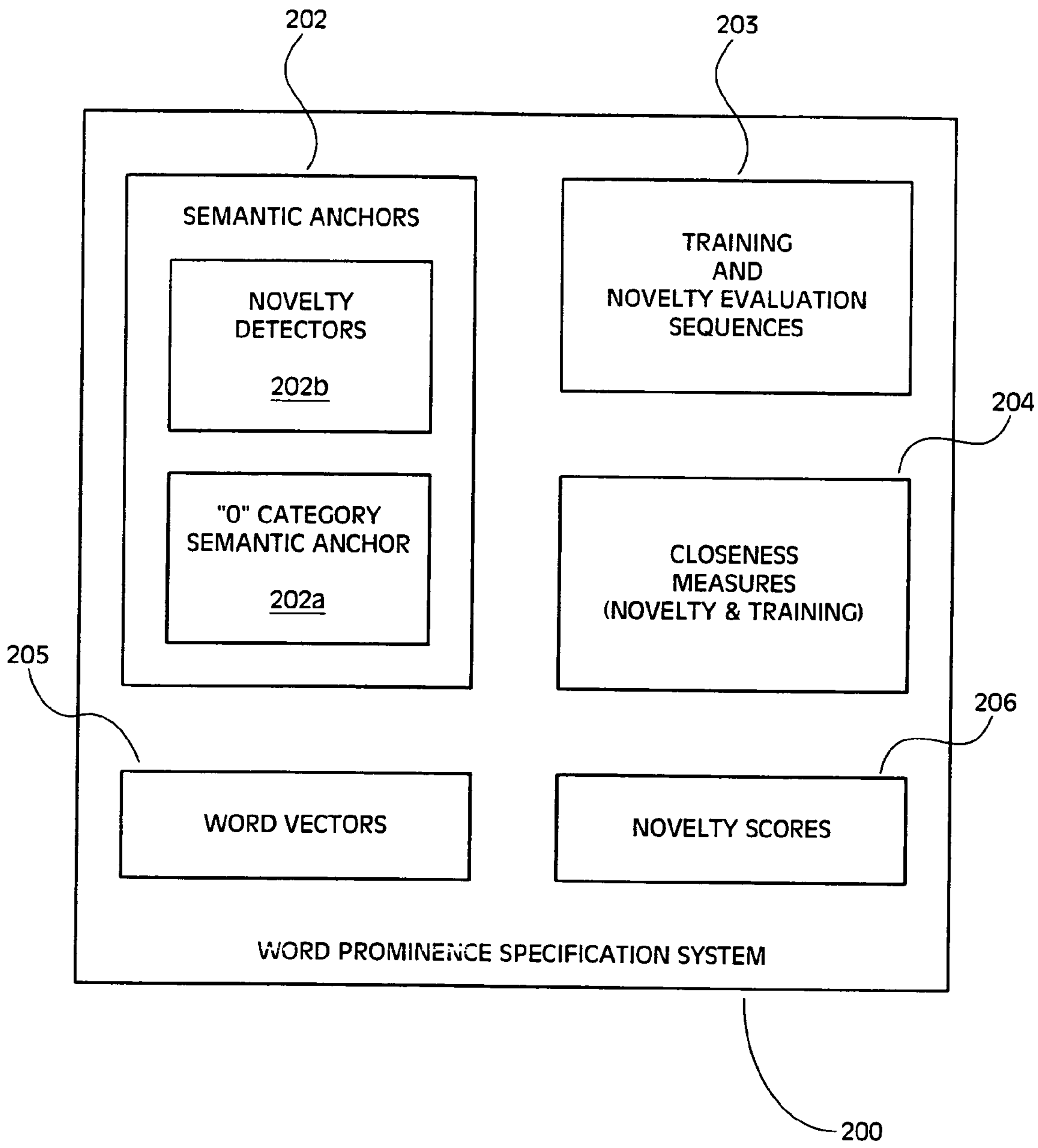
FIG. 2 is a block diagram illustrating one embodiment of the word prominence specification system of FIG. 1.

FIG. 2 is a block diagram illustrating a generalized embodiment of selected components of the word prominence specification system 200 that may be used in the TTS 100 of FIG. 1. The selected components include semantic anchors 202, training and novelty evaluation sequences 203, a closeness measure 204, word vectors 205, and a novelty score 206. The word prominence specification system 200 employs a plurality of semantic anchors 202, including one semantic anchor that represents the centroid of all preceding sentences in the current document of interest, also referred to herein as the "0" category semantic anchor **202*a*, and numerous other semantic anchors representing centroids relevant to the general discourse domain, which are referred to herein as the novelty detectors 202*b***.

In one embodiment, the "0" category semantic anchor **202*a* and novelty detectors 202*b* are determined automatically after the addition of the current sentence to the preceding sentences in the current document of interest. Using the closeness measures 204, a plurality of word vectors 205, one for each word in the current sentence, is classified against the "0" category semantic anchor 202*a* and the novelty detectors 202*b*, and an appropriate novelty score 206** is obtained to characterize the "novelty" of each word to the current document so far, in view of the general discourse domain, i.e., whether the word represents new information or previously given information (or is neutral).

When the novelty score 206 is high enough, then the word prominence specification system 200 assigns a corresponding word prominence, such that the word represented by the word vector 205 is suitably emphasized when generating the acoustic speech signal 120. Otherwise, the word prominence specification system 200 assigns a word prominence so that the word represented by the word vector 205 is suitably de-emphasized. The word prominence specification system 200 may be configured so that it operates completely automatically and requires no input from the user.

It should be noted that the emphasis or de-emphasis of the words represented by the word vectors 205 could be accomplished in a number of ways, some of which may be known in the art, without departing from the scope of the present invention. For example, in one embodiment, the TTS 100 may emphasize (or de-emphasize) words by altering the prosodic generation 112 in accordance with the prosody model 111, including altering the pitch, volume, and phoneme duration of the resulting acoustic speech signal 120, as is known in the art.

Figure 3:
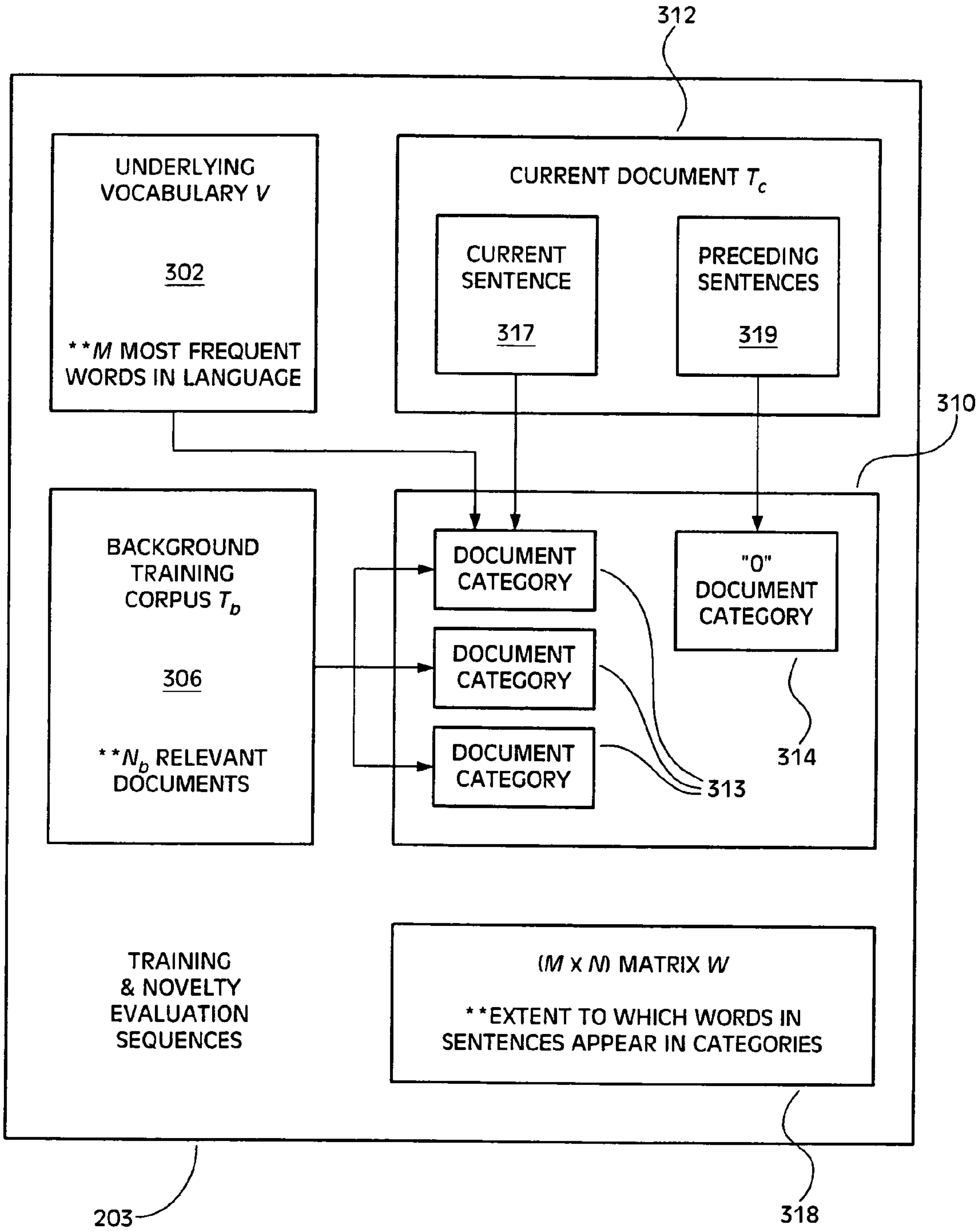
FIG. 3 is a block diagram illustrating one embodiment of the training and evaluation sequences of FIG. 2.

FIG. 3 is a block diagram illustrating an embodiment of training and novelty evaluation sequences 203. The training and novelty evaluation sequences 203 are used, according to one embodiment, to determine the semantic anchors 202 and to evaluate novelty 206. Components of training and novelty evaluation sequences 203 includes underlying vocabulary V 302, background training corpus $T_b$ 306, document categories 310, current document $T_c$ 312, and a matrix W 318, all of which are explained in greater detail below. The document categories 310 includes a number $N_1$ of document categories 313 and an additional document category, which is referred to herein as the "0" document category 314.

The underlying vocabulary V 302 comprises the M most frequent words in the language. The background training corpus $T_b$ 306 comprises a collection of $N_b$ documents relevant to the general discourse domain, binned into the document categories 313 during training the word prominence specification system 200. In one embodiment, the collection of $N_b$ documents may be binned randomly into the number $N_1$ of document categories 313. In a typical embodiment, the number M of the most frequent words in the language and the number of relevant documents $N_b$ are on the order of several thousands, while the number $N_1$ of the document categories 313 is typically less than 10.

In one embodiment, the current document so far $T_c$ 312 comprises the current sentence 317 and the preceding sentences 319 to the current sentence 317. The current sentence 317, which is first evaluated word by word against all existing categories 310 (313 and 314), is binned into the "0" document category 314 prior to processing of the next sentence. The preceding sentences 319 are binned into "0" document category 314. The total number N of document categories 310 in T is denoted as $N=N_1+1\leqq 10$, where T is the union of the background training corpus $T_b$ 306 and the current document so far $T_c$ 312, which is denoted as $T=T_b\cup T_c$.

The (M×N) matrix W 318 comprises entries $w_{ij}$ that suitably reflect the extent to which each word $w_i\in V$ appears in each document category 313/314. A reasonable expression for $w_{ij}$ is:

$$w_{ij} = (1-\varepsilon_i)\frac{c_{ij}}{n_j}, \tag{5}$$

where $c_{ij}$ is the number of times $w_i$ occurs in category j, $n_j$ is the total number of words present in this category, and $\epsilon_i$ is the normalized entropy of $w_i$ in the corpus T.

For each word $w_i$, defining $t_i$ as the sum of $c_{ij}$ over all possible document categories, which is represented by:

$$t_i = \sum_{j=1}^{N} c_{ij} \tag{6}$$

where $t_i$ represents the total number of times the word wi occurs in the entire corpus. The normalized entropy $\epsilon_i$ may then be determined as follows:

$$\varepsilon_i = \frac{-1}{\log N}\sum_{j=1}^{N}\frac{c_{ij}}{t_i}\log\left(\frac{c_{ij}}{t_i}\right) \tag{7}$$

where $$0 \le \varepsilon_i \le 1 \tag{8}$$

with equality occurring when $c_{ij}=t_i$ and $c_{ij}=t_i/N$, respectively. A value of $\epsilon_i$ close to 1 indicates that a word is distributed across many documents throughout the corpus, whereas a value of $\epsilon_i$ close to 0 indicates that the word is present in just a few documents.

Thus, the term $(1-\epsilon_i)$, which may be referred to as a "global weight," can be viewed as a measure of the indexing power of the word $w_i$. This global weighting implied by $(1-\epsilon_i)$, reflects the fact that two words appearing with the same count in a particular category 313/314 do not necessarily convey the same amount of information; this is subordinated to the distribution of the words in the entire collection T.

To obtain the "0" category semantic anchor 202*a* and novelty detectors 202*b* from the above-described components in FIG. 3, the word prominence specification system 200 performs a singular value decomposition (SVD) of matrix W 318 as follows:

$$W=USV^T, \tag{9}$$

where U is the (M×N) left singular matrix with row vectors $u_i$ $(1\leqq i\leqq M)$, S is the (N×N) diagonal matrix of N singular values $s_1\geqq s_2\geqq \ldots \geqq s_N>0$, V is the (N×N) right singular matrix with row vectors $v_j$ $(1\leqq j\leqq N)$, and superscript $^T$ denotes matrix transposition. This (rank-N) decomposition defines a mapping between:

(i) the set of words in the underlying vocabulary V 302 and, after appropriate scaling by the singular values, the N-dimensional vector $\bar{u}_i=u_iS^{1/2}(1\leqq i\leqq M)$, and (ii) the set of words in the current document so far $T_c$ 312, including the preceding sentences 319 and the current sentence 317, and, again after appropriate scaling by the singular values, the N-dimensional vectors $\bar{v}_j=v_jS^{1/2}(1\leqq j\leqq N)$.

The former vectors $\bar{u}_i$ 205 each represent a particular word in the underlying vocabulary V 302. The latter vectors $\bar{v}_j(j\neq 0)$ are the "novelty" detectors 202*b* (i.e., the semantic anchors 202 associated with the $N_1$ document categories 313 after binning the current sentence 317 of the current document so far $T_c$ 312). By convention, the vector representing the "0" category semantic anchor 202*a* (of the current document so far $T_c$ 312) associated with all of the words in the preceding sentences 319, is referred to as $\bar{v}_o$.

The mapping defined above by equation (9) and the accompanying text has a semantic nature since the relative positions of the word vectors 205 and the semantic anchors 202*a-b* is determined by the overall pattern of the language used in all of the documents represented in T, as opposed to the specific words or constructs. Hence, a word vector $\bar{u}_i$ 205 that is "close" (in some suitable metric) to the "0" category semantic anchor 202*a* $\bar{v}_o$ is likely to represent a word that is semantically related to the words in the "0" document category 314 (i.e., the words in the current document so far $T_c$ 312), while a word vector 205 that is "close" to one or more of the novelty detectors 202*b* $\bar{v}_j(j\neq 0)$, is likely to represent a word that is semantically related to words in one of the other $N_1$ document categories 313. When semantically related to the words in the current document so far $T_c$ 312, the word likely represents given information, whereas when semantically related to the words in the other $N_1$ document categories 313, the word likely represents new information. Thus, the "0" category semantic anchor 202*a*, novelty detectors 202*b*, and word vectors 205, operating together, offer a basis for determining the "novelty" of a word in the current sentence 317, given the current document so far $T_c$ 312.

To determine the "novelty" of a word, the word prominence specification system 200 defines an appropriate "closeness measure" 204 to compare the word vectors $\bar{u}_i$ 205 to the semantic anchors 202 (i.e., "0" category semantic anchor 202*a* $\bar{v}_o$ and novelty detectors 202*b* $\bar{v}_j$). In one embodiment, a natural metric to consider for the closeness measure 204 is the cosine of the angle between word vectors 205 and the semantic anchors 202*a-b*, as follows:

$$K(\bar{u}_i, \bar{v}_j) = \cos(u_i S^{1/2}, v_j S^{1/2}) = \frac{u_i S v_j^T}{\|u_i S^{1/2}\| \|v_j S^{1/2}\|}, \quad (10)$$

for $1 \leqq i \leqq M$ and $1 \leqq j \leqq N$.

Using the equation in (10), it would be possible to classify each word in the current sentence by assigning it to the category 313/314 associated with the maximum similarity. However, the closest category does not reveal the closeness of a word in a current sentence 317 to the current document so far $T_c$ 312. The closeness of the words in the current sentence 317 to the current document so far $T_c$ 312 is represented by the closeness measures 204 of the word vectors $\bar{u}_i$ to the "0" category semantic anchor 202*a* $\bar{v}_o$ associated with the "0" category 314. This can be determined through the use of a novelty score 206.

The word prominence specification system 200 compares the closeness measure 204 associated with the "0" document category 314 of the current document so far $T_c$ 312 with the average closeness measure 204 associated with the other $N_1$ categories 313. In one embodiment, the word prominence specification system 200 accomplishes the comparison by defining a content prediction index $P(\bar{u}_i)$ 208 for the word vector $\bar{u}_i$ as follows:

$$P(\bar{u}_i) = \frac{K(\bar{u}_i, \bar{v}_o)}{\frac{1}{N}\sum_{j=1}^{N} K(\bar{u}_i, \bar{v}_j)} \quad (11)$$

The higher the content prediction index $P(\bar{u}_i)$ 208, the more predictable the word represented by word vector $\bar{u}_i$ is, given the current document so far $T_c$ 312. In one embodiment, the word prominence specification system 200 defines the novelty score $N(\bar{u}_i)$ 206 as inversely proportional to the content prediction index $P(\bar{u}_i)$ 208, as follows:

$$N(\bar{u}_i) \approx \frac{1}{P(\bar{u}_i)} \quad (12)$$

When C denotes the set of all content words (as opposed to the words of the underlying vocabulary V 302) in the sentence, then the following equation defines the novelty score $N(\bar{u}_i)$ 206:

$$N(\bar{u}_i) = \frac{1}{1 - \frac{P(\bar{u}_i)}{\frac{1}{|C|}\sum_{k \in C} P(\bar{u}_k)}} \quad (13)$$

Generally, as used herein, a "content word" is any word which is not a function word (again, function words include words such as "the," "for," and "in," as noted above).

The novelty score $N(\bar{u}_i)$ 206 is interpreted as follows. If $N(\bar{u}_i)<0$, the word associated with word vector $\bar{u}_i$ should be assigned less prominence than would have otherwise been the case. On the other hand, if $N(\bar{u}_i)>0$, the word should be assigned more prominence.

Turning now to FIGS. 4-8, the particular methods of the invention are described in terms of computer software with reference to a series of flowcharts. The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-accessible media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application . . . ), as taking an action or causing a result. Such expressions are merely a shorthand way of saying that execution of the software by a computer causes the processor of the computer to perform an action or a produce a result.

Figure 4:
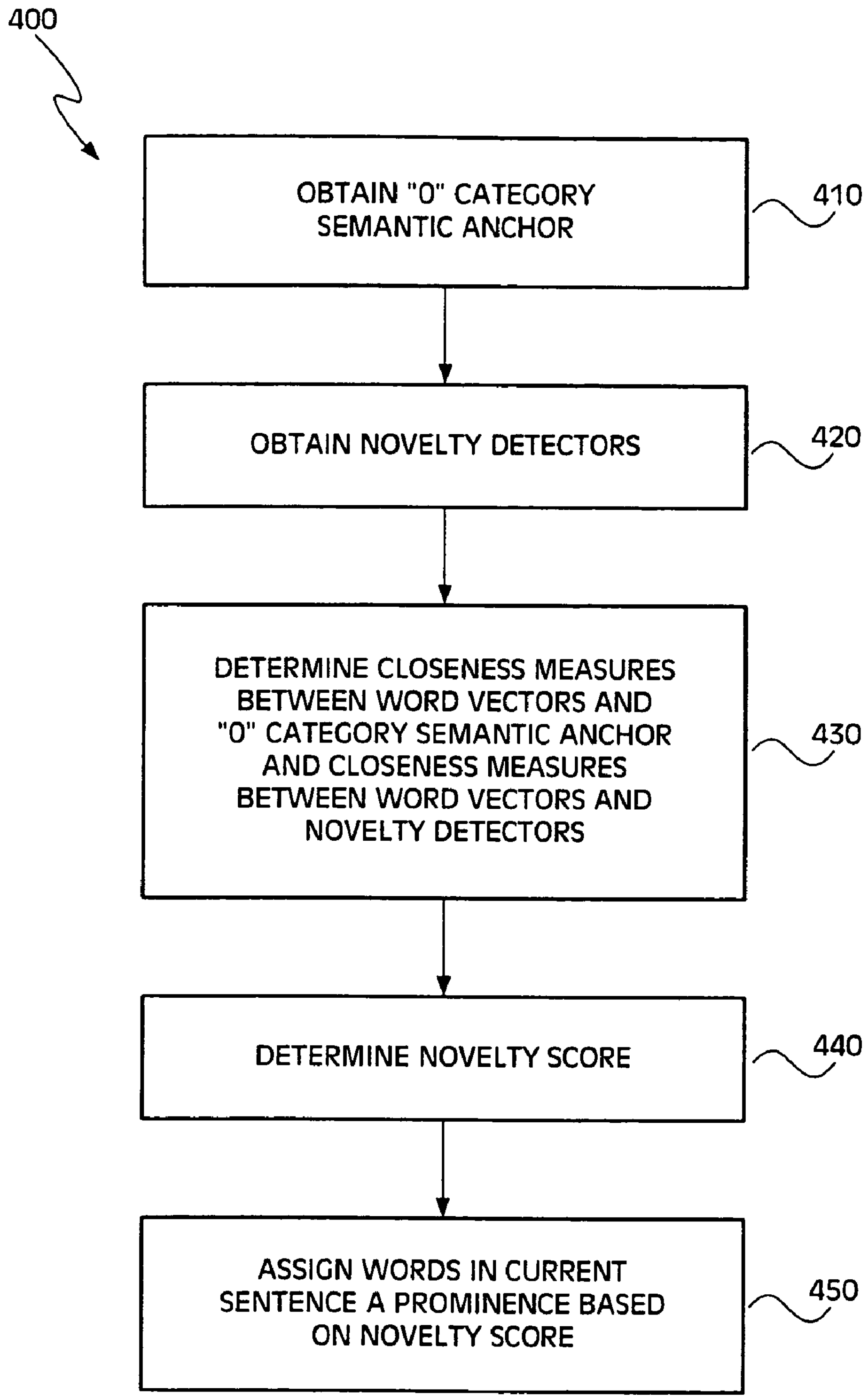
FIG. 4 is a flow diagram illustrating an embodiment of a method for word prominence assignment, as may be performed by the word prominence specification system illustrated in FIGS. 1-3.

FIG. 4 is a flow diagram illustrating an embodiment of a method 400 for word prominence assignment, as may be performed by a TTS 100 incorporating a word prominence specification system 200. At processing block 410, the word prominence specification system 200 obtains the "0" category semantic anchor 202*a* associated with the "0" category 314 of the current document so far $T_c$ 312, i.e., the preceding sentences 319. At processing block 420, the word prominence specification system 200 obtains the novelty detectors 202*b*.

In one embodiment, at processing block 430, the word prominence specification system 200 computes two different types of closeness measures 204: the closeness measures 204 between the word vectors $\bar{u}_i$ and the "0" category vector $\bar{v}_o$ and the closeness measures 204 between the word vectors $\bar{u}_i$ and the "novelty" detectors $\bar{v}_j (j \neq 0)$ 202*a*.

In one embodiment, at processing block 440, the word prominence specification system 200 uses the closeness measures 204 to determine a novelty score 206 for the words in the current sentence 317. At processing block 450, once the novelty score 206 is determined, the word prominence specification system 200 may assign the words of the current sentence 317 an appropriate prominence as indicated by the novelty score 206. Further details of obtaining the "0" category semantic anchor 202*a*, novelty detectors 202*b*, word vectors 205, and determining the closeness measures 204 and novelty score 206 are described in FIGS. 5-8.

Figure 5:
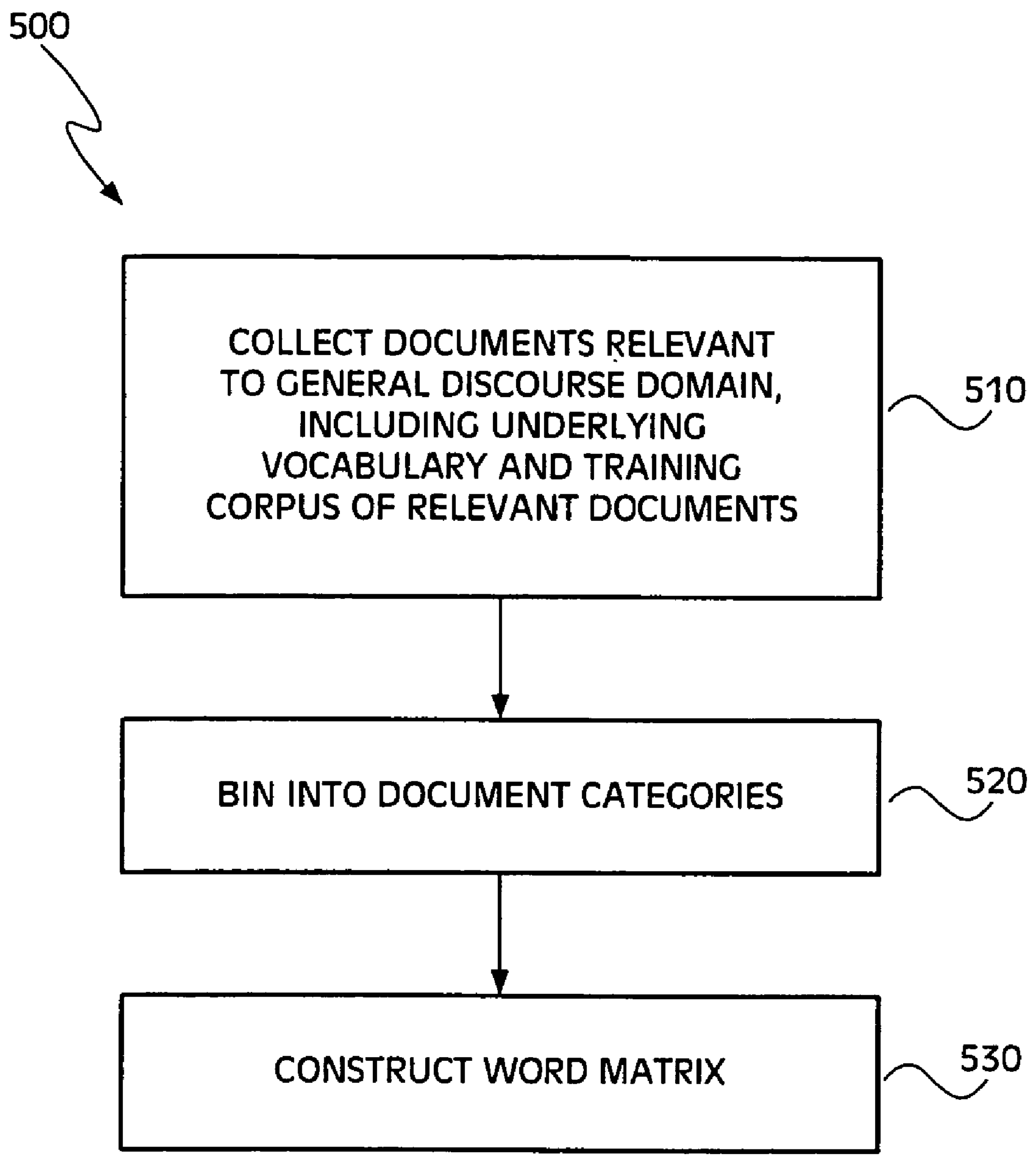
FIG. 5 is a flow diagram illustrating an embodiment of a method for semantic anchor training, as may be performed by the word prominence specification system illustrated in FIGS. 1-3.

FIG. 5 is a flow diagram illustrating an embodiment of a method 500 for semantic anchor training, as may be performed by a TTS 100 incorporating a word prominence specification system 200. During training of the word prominence specification system 200, the method 500 for semantic anchor training proceeds as follows. At processing block 510, the word prominence specification system 200 collects documents relevant to the general discourse domain, including an underlying vocabulary and a training corpus of relevant documents. At processing block 520, the word prominence specification system 200 bins the documents into the $N_1$ document categories 313, and at processing block 530, further constructs a word matrix W 318 that represents the extent to which the words appear in the $N_1$ document categories 313.

Figure 6:
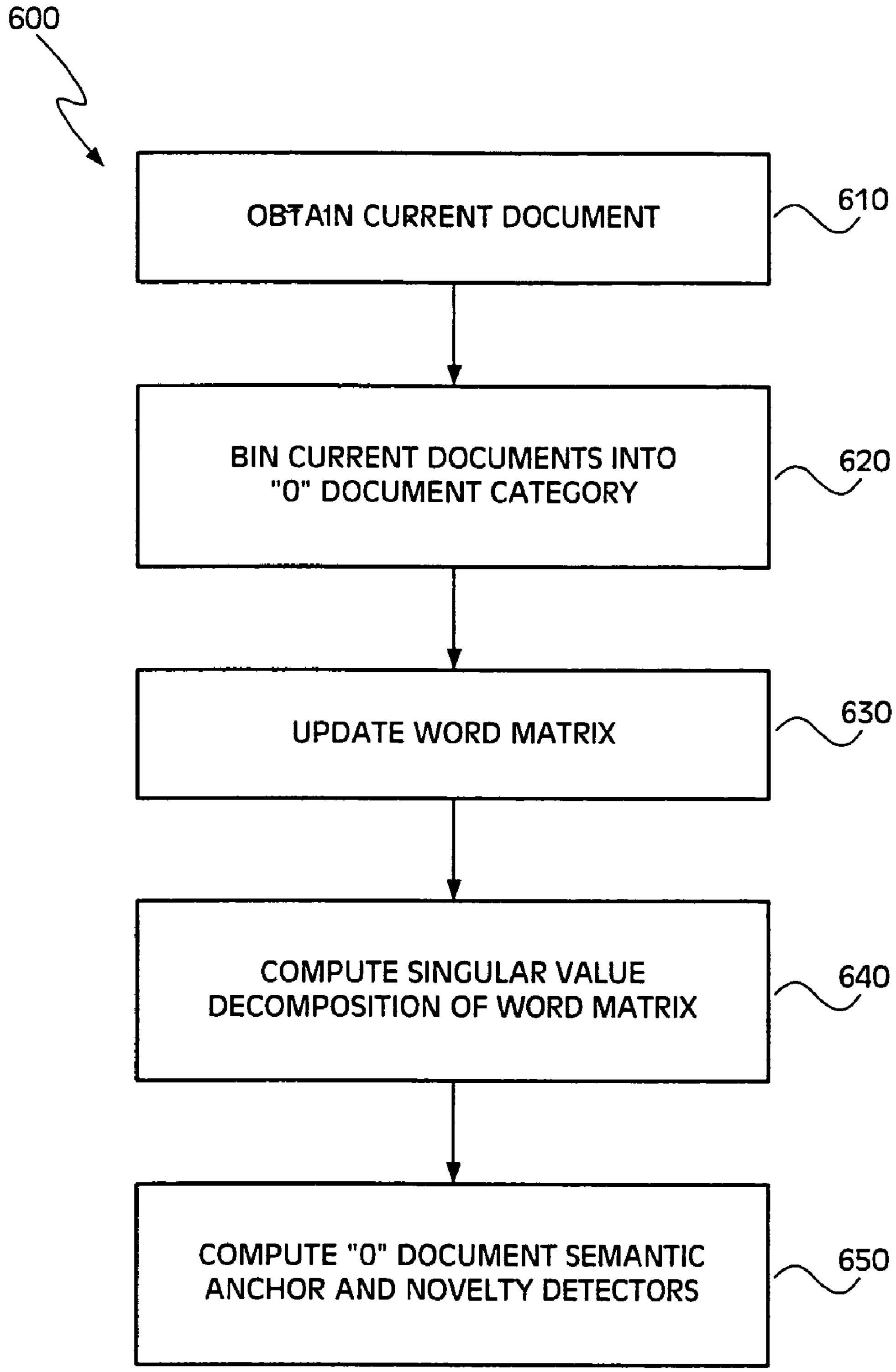
FIG. 6 is a flow diagram illustrating an embodiment of a method for determining semantic anchors, as may be performed by the word prominence specification system illustrated in FIGS. 1-3.

FIG. 6 is a flow diagram illustrating an embodiment of a method 600 for determining semantic anchors, as may be performed by a TTS 100 incorporating a word prominence specification system 200. During operation of the word prominence specification system 200, the method 600 for determining semantic anchors proceeds as follows. At processing block 610, the word prominence specification system 200 obtains the current document so far $T_c$ 312 (including current sentence 317 and preceding sentences 319). At processing block 620, the word prominence specification system 200 bins the current document so far $T_c$ 312 into the "0" document category 314.

In one embodiment, at processing block 630, the word prominence specification system 200 updates the word matrix W 318, so that the word matrix W 318 now represents the extent to which the words appear in the $N_1$ document categories 313, as well as the extent to which the words appear in the "0" document category 314 representing the preceding sentences 319.

In one embodiment, at processing block 640, the word prominence specification system 200 computes a singular value decomposition of the word matrix W 318 as previously described. At processing block 650, the method 600 for determining semantic anchors concludes by computing the "0" category semantic anchor 202*b* associated with the "0" category 314, which represents the semantic relationships of the words in the preceding sentences 319, and the novelty detectors 202*a* associated with other $N_1$ categories 313.

Figure 7:
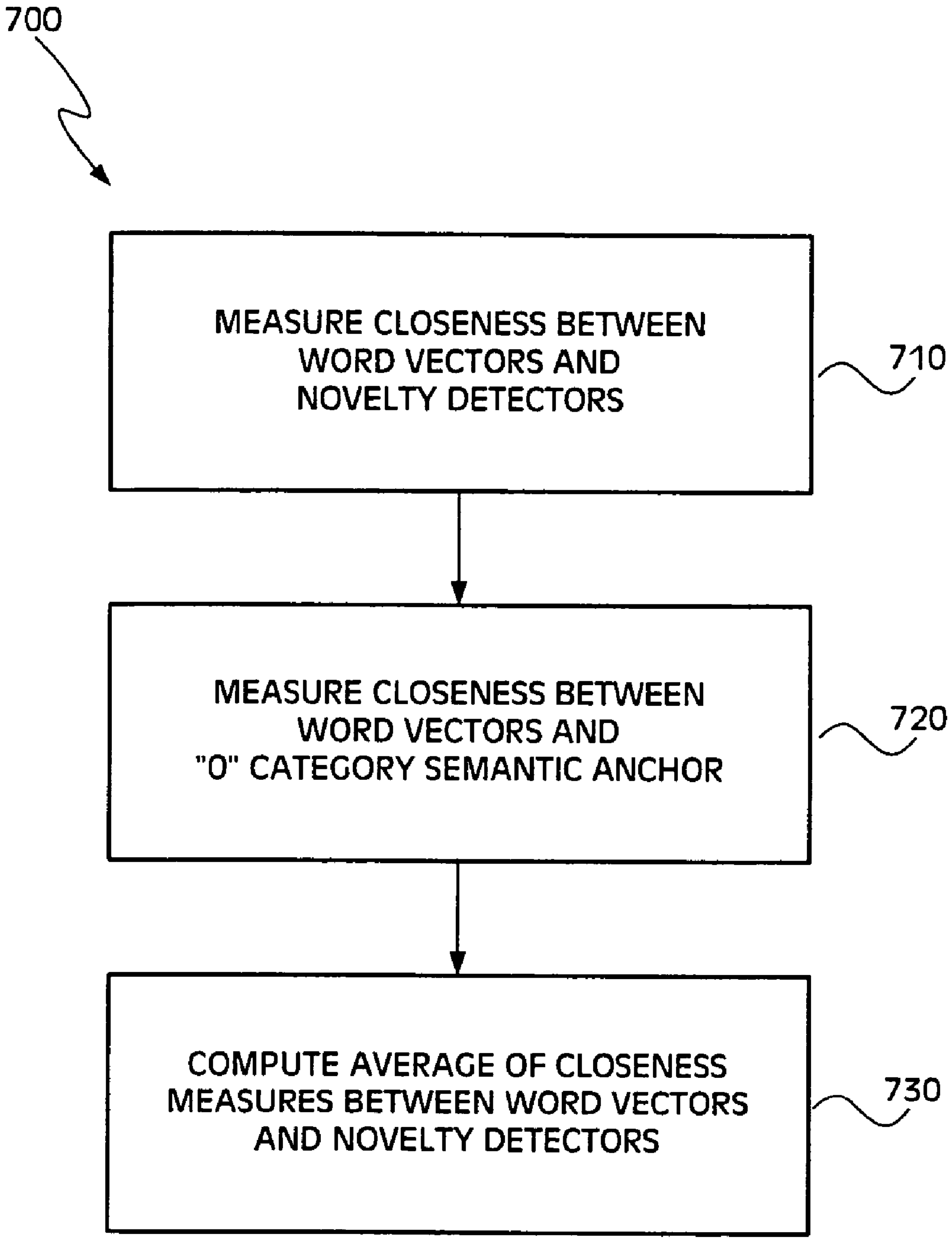
FIG. 7 is a flow diagram illustrating an embodiment of a method for closeness measurement processing, as may be performed by the word prominence specification system illustrated in FIGS. 1-3.

FIG. 7 is a flow diagram illustrating an embodiment of a method 700 for closeness measurement processing, as may be performed by a TTS 100 incorporating a word prominence specification system 200. During operation of the word prominence specification system 200, the method 700 for closeness measurement processing proceeds as follows. At processing block 710, the word prominence specification system 200 measures the closeness between the word vectors 205 and the novelty detectors 202*b* for the $N_1$ document categories 313 to generate a set of closeness measures 204. At processing block 720, the word prominence specification system 200 measures the closeness between the word vectors 205 and the "0" category semantic anchor 202*a* for the "0" category 314 to generate another set of closeness measures 204. In preparation for determining a novelty score 206, at processing block 730 the word prominence specification system 200 computes the average of the closeness measures 204 associated with the novelty detectors 202*b*.

Figure 8:
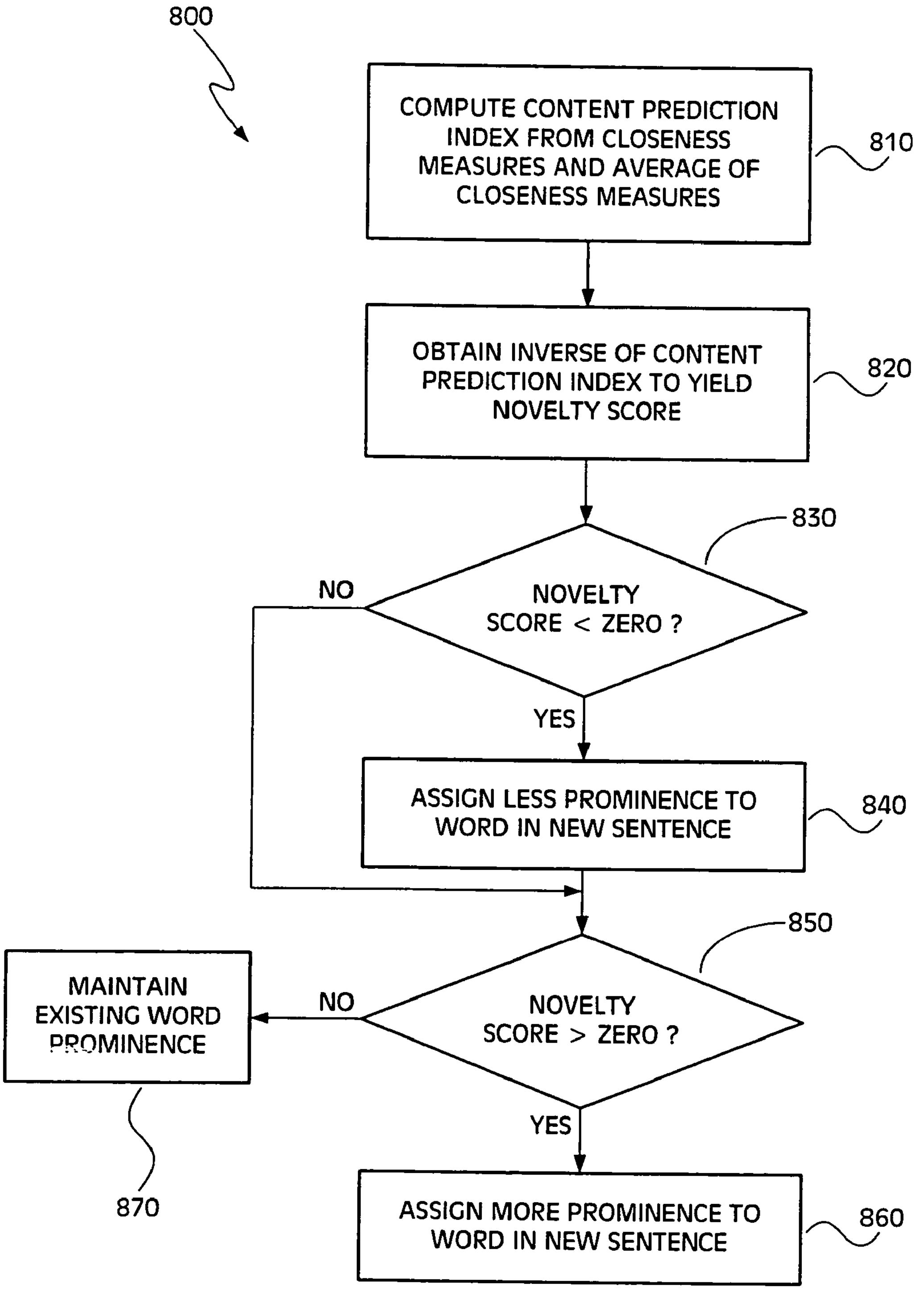
FIG. 8 is a flow diagram illustrating an embodiment of a method for novelty score processing, as may be performed by the word prominence specification system illustrated in FIGS. 1-3.

FIG. 8 is a flow diagram illustrating an embodiment of a method 800 for novelty score processing, as may be performed by a TTS 100 incorporating a word prominence specification system 200. During operation of the word prominence specification system 200, the method 800 for novelty score processing proceeds as follows. At processing block 810, the word prominence specification system 200 computes a content prediction index 208 from the closeness measures 204 associated with the "0" category semantic anchor 202*a* (see FIG. 7, block 720) and the average of the closeness measures 204 associated with the novelty detectors 202*b* (see FIG. 7, block 730).

In one embodiment, at processing block 820, the word prominence specification system 200 obtains the inverse of the content prediction index 208 to yield a novelty score 206. At decision block 830, when the novelty score 206 for a word vector 205 is less than zero, the word prominence specification system 200 at processing block 840 assigns less prominence to the word in the current sentence 317 represented by the word vector 205. Conversely, at decision block 850, when the novelty score 206 for a word vector 205 is greater than zero, at processing block 860, the word prominence specification system 200 assigns more prominence to the word in the current sentence 317 represented by the word vector 205. When the novelty score 206 is zero or close to zero, then the word prominence specification system 200 maintains the existing prominence assigned by the TTS 100, as illustrated at block 870.

Figure 9:
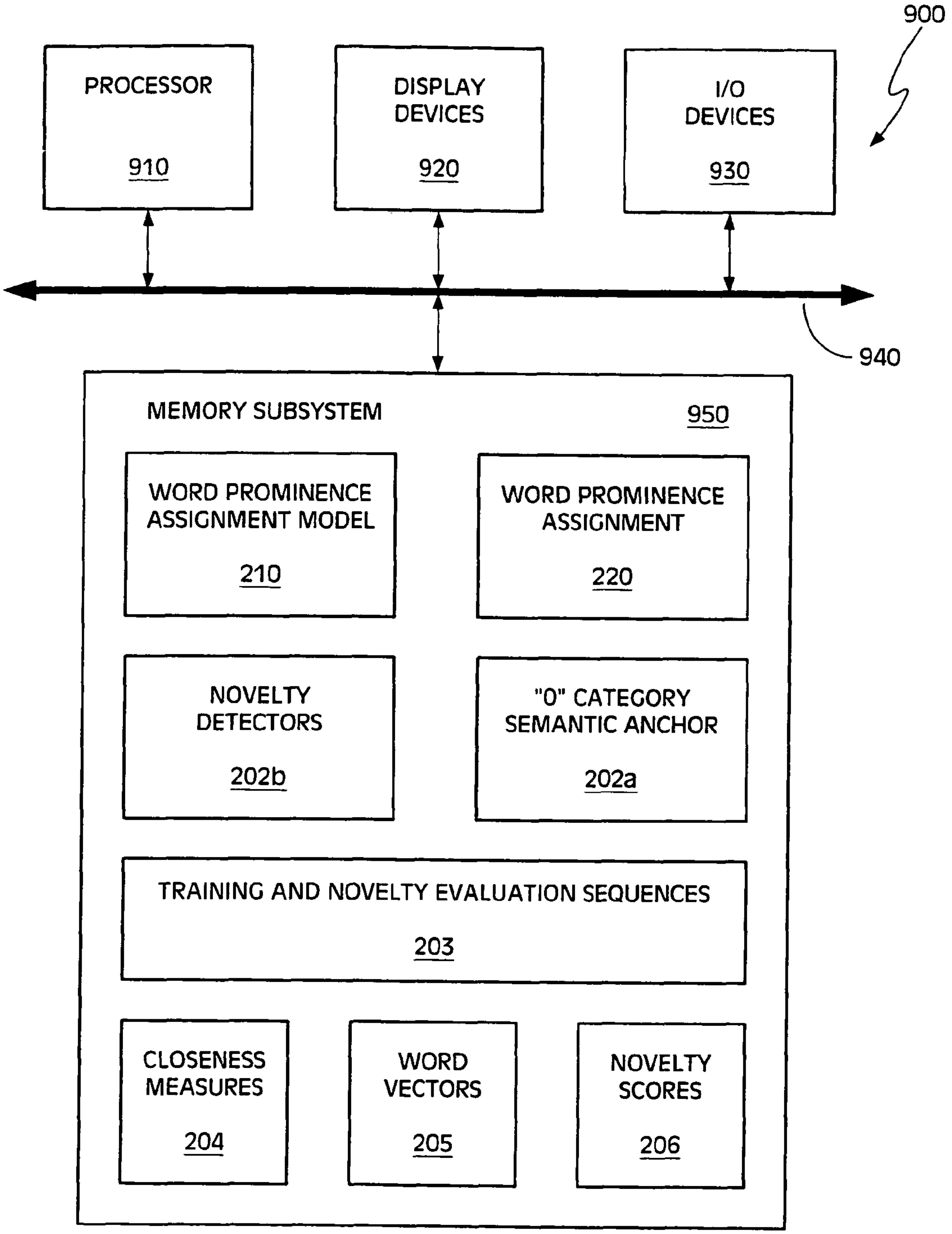
FIG. 9 is a block diagram of one embodiment of a computer system in which the word prominence specification system of FIGS. 1-3 may be implemented.

FIG. 9 is a block diagram of one embodiment of a computer system on which the TTS 100 and word prominence specification system 200 may be implemented. Computer system 900 includes a processor (or processors) 910, display device 920, and input/output (I/O) devices 930, coupled to each other via a bus 940. Additionally, a memory subsystem 950, which can include one or more of cache memories, system memory (RAM), and nonvolatile storage devices (e.g., magnetic or optical disks), is also coupled to bus 940 for storage of instructions and data for use by processor 910. I/O devices 930 represent a broad range of input and output devices, including keyboards, cursor control devices (e.g., a trackpad or mouse), microphones to capture the voice data, speakers, network or telephone communication interfaces, printers, etc. Computer system 900 may also include well-known audio processing hardware and/or software to transform digital voice data to analog form, which can be processed by the TTS 100 implemented in computer system 900. In addition to personal computers, laptop computers, and workstations, in some embodiments, computer system 900 may be incorporated in a mobile computing device such as a personal digital assistant (PDA) or mobile telephone without departing from the scope of the invention.

Components 910 through 950 of computer system 900 perform their conventional functions known in the art. Collectively, these components are intended to represent a broad category of hardware systems, including but not limited to general purpose computer systems based on the PowerPC® processor family of processors available from Motorola, Inc. of Schaumburg, Ill., or the Pentium® processor family of processors available from Intel Corporation of Santa Clara, Calif.

It is to be appreciated that various components of computer system 900 may be re-arranged, and that certain implementations of the present invention may not require nor include all of the above components. For example, a display device may not be included in system 900. Additionally, multiple buses (e.g., a standard I/O bus and a high performance I/O bus) may be included in system 900. Furthermore, additional components may be included in system 900, such as additional processors (e.g., a digital signal processor), storage devices, memories, network/communication interfaces, etc.

In the illustrated embodiment of FIG. 9, the method and apparatus for speech recognition using latent semantic adaptation with word and document updates according to the present invention as discussed above is implemented as a series of software routines run by computer system 900 of FIG. 9. These software routines comprise a plurality or series of instructions to be executed by a processing system in a hardware system, such as processor 910. Initially, the series of instructions are stored on a storage device of memory subsystem 950. It is to be appreciated that the series of instructions can be stored using any conventional computer-readable or machine-accessible storage medium, such as a diskette, CD-ROM, magnetic tape, DVD, ROM, Flash memory, etc. It is also to be appreciated that the series of instructions need not be stored locally, and could be stored on a propagated data signal received from a remote storage device, such as a server on a network, via a network/communication interface. The instructions are copied from the storage device, such as mass storage, or from the propagated data signal into a memory subsystem 950 and then accessed and executed by processor 910. In one implementation, these software routines are written in the C++ programming language. It is to be appreciated, however, that these routines may be implemented in any of a wide variety of programming languages.

These software routines are illustrated in memory subsystem 950 as word prominence assignment model instructions 210 and word prominence assignment instructions 220. In the illustrated embodiment, the memory subsystem 950 of FIG. 9 also includes the "0" category semantic anchor 202*a*, the novelty detectors 202*b*, the closeness measures 204, the word vectors 205, and the novelty scores 206 that support the word prominence specification system 200.

In alternate embodiments, the present invention is implemented in discrete hardware or firmware. For example, one or more application specific integrated circuits (ASICs) could be programmed with the above-described functions of the present invention. By way of another example, TTS 100 and the word prominence specification system 200 of FIG. 1, or selected components thereof could be implemented in one or more ASICs of an additional circuit board for insertion into hardware system 900 of FIG. 9.

It is to be appreciated that the method and apparatus for predicting word prominence in speech synthesis may be employed in any of a wide variety of manners. By way of example, a TTS 100 employing word prominence assignment could be used in conventional personal computers, security systems, home entertainment or automation systems, etc.

Preliminary experiments were conducted using an underlying vocabulary of approximately 19,000 most frequent words in the language and background training documents extracted from the Wall Street Journal database, to which was appended either example query sentence (1) or (3). The background documents were chosen to reflect general financial news information related to either "Tennessee" or "mother" (approximately 100 documents on each topic). They were then binned into randomly selected document categories 313, to come up with four different renditions of the general discourse domain. This multiplicity better rendered the weak indexing power of function words, which otherwise might be accorded too much semantic weight. With the addition of the current sentence 317, i.e. either (1) or (3), to the current document so far 312 resulted in a total number of five categories, or N=5.

For each word in the sentences (2) and (4), the above approach was followed to obtain closeness measures 204 across all five categories, and then compute novelty scores 206 for the three content words, "mama," "lives" and "Memphis." The results are listed below in Table I, normalized to the (neutral) score of the word "lives" in each case for ease of comparison.

TABLE I

| Content Word | Sentence (2) | Sentence (4) |
|---|---|---|
| mama | 117.4 | 109.2 |
| lives | 0.0 | 0.0 |
| Memphis | 158.5 | 159.1 |

As can be seen from the results listed in Table I, for sentence (2), the proposed approach assigns "mama" about 7% less prominence than in sentence (4), which is consistent with the above discussion. On the other hand, "Memphis" is assigned approximately the same level of prominence in both cases: the difference is less than 0.5%. This illustrates that the novelty detectors 202*b* work as expected, by causing the TTS 100 to emphasize "mama" more in sentence (2) than in sentence (4), despite the fact that in either case the word "mama" had never been seen before in the current document.

Thus, a method and apparatus for a TTS 100 using a word prominence specification system 200 has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

We claim:

1. A method for assigning word prominence in synthetic speech comprising:
- determining, through a processor, whether an information in a current sentence is new or previously given based on a semantic relationship in a vector space between the current sentence and a number of preceding sentences;
- assigning, through the processor, a word prominence for the synthetic speech to a word in the current sentence in accordance with the information determination; and
- generating, through an output device, a speech representative of the current sentence.

2. The method of claim 1, further comprising:
- determining the semantic relationship between the current sentence and the number of preceding sentences using latent semantic analysis (LSA).

3. The method of claim 2, wherein determining the semantic relationship using LSA includes:
- generating a word prominence assignment model comprising semantic anchors associated with the current sentence and the number of preceding sentences; and
- classifying each word in the current sentence against the semantic anchors to determine whether the word represents the new or previously given information.

4. The method of claim 3, wherein classifying each word in the current sentence against the semantic anchors includes:
- measuring a closeness between a vector representing the word and the semantic anchors to determine closeness measures; and
- determining a novelty score from the closeness measures, wherein the novelty score has a first value when the information is new and a second value when the information is previously given.

5. The method of claim 4, wherein the first value is a positive value and the second value is a negative value.

6. The method of claim 4, wherein the first value is a negative value and the second value is a positive value.

7. The method of claim 4, wherein determining the novelty score from the closeness measures includes:
- computing a content prediction index from a first closeness measure of the closeness measures semantic anchor associated with the number of preceding sentences and a second closeness measure of the closeness measures of the semantic anchors associated with the current sentence; and
- inverting the content prediction index.

8. The method of claim 1, wherein assigning a word prominence to a word in the current sentence includes:
- emphasizing the word in the current sentence when the word represents the new information; and de-emphasizing the word in the current sentence when the word represents the previously given information.

9. The method of claim 8, wherein emphasizing and de-emphasizing is achieved through altering a prosodic feature of the word.

10. The method of claim 9, wherein altering the prosodic feature includes altering at least one of volume, pitch, and phoneme duration.

11. An article of manufacture comprising:

a machine accessible medium storing executable instructions that, when accessed by a machine, cause the machine to determine, through a processor, whether an information in a current sentence is new or previously given in accordance with a semantic relationship in a vector space between the current sentence and a number of preceding sentences;

assign, through the processor, a word prominence, for synthetic speech, to a word in the current sentence in accordance with the information determination; and generate, through an output device, a speech representative of the current sentence.

12. The article of manufacture of claim 11, wherein the executable instructions, when accessed, further cause the machine to determine the semantic relationship between the current sentence and the number of preceding sentences using latent semantic analysis (LSA).

13. The article of manufacture of claim 12, wherein the executable instructions, when accessed, further cause the machine, when determining the semantic relationship using LSA, to:

generate a word prominence assignment model comprising semantic anchors associated with the current sentence and the number of preceding sentences; and classify each word in the current sentence against the semantic anchors to determine whether the word represents the new or previously given information.

14. The article of manufacture of claim 13, wherein the executable instructions, when accessed, further cause the machine, when classifying each word in the current sentence against the semantic anchors, to:

measure a closeness between a vector representing the word and the semantic anchors to determine closeness measures; and determine a novelty score from the closeness measures, wherein the novelty score has a first value when the information is new and a second value when the information is previously given.

15. The article of manufacture of claim 14, wherein the first value is a positive value and the second value is a negative value.

16. The article of manufacture of claim 14, wherein the first value is a negative value and the second value is a positive value.

17. The article of manufacture of claim 14, wherein the executable instructions, when accessed, further cause the machine, when determining the novelty score from the closeness measures, to:

compute a content prediction index from a first closeness measure of the closeness measures of the semantic anchor associated with the number of preceding sentences and a second closeness measure of the closeness measures of the semantic anchors associated with the current sentence; and invert the content prediction index.

18. The article of manufacture of claim 11, wherein the executable instructions, when accessed, further cause the machine, when assigning a word prominence to a word in the current sentence, to:

emphasize the word in the current sentence when the word represents the new information; and de-emphasize the word in the current sentence when the word represents the previously given information.

19. The article of manufacture of claim 18, wherein the executable instructions, when accessed, further cause the machine, when emphasizing and de-emphasizing, to alter a prosodic feature of the word.

20. The article of manufacture of claim 19, wherein altering the prosodic feature includes altering at least one of volume, pitch, and phoneme duration.

* * * * *